Sept. 24, 1968 C. W. ZEBE 3,403,228

TELEPHONE PARTY-LINE ISOLATION AND RANGE EXTENSION

Filed March 9, 1965 7 Sheets-Sheet 1

INVENTOR
C. W. ZEBE
BY
S E Hollander
ATTORNEY

TELEPHONE PARTY-LINE ISOLATION AND RANGE EXTENSION

Filed March 9, 1965 7 Sheets-Sheet 2

TELEPHONE PARTY-LINE ISOLATION AND RANGE EXTENSION

Filed March 9, 1965 7 Sheets-Sheet 4

TELEPHONE PARTY-LINE ISOLATION AND RANGE EXTENSION

Filed March 9, 1965

TELEPHONE PARTY-LINE ISOLATION AND RANGE EXTENSION

Filed March 9, 1965

United States Patent Office 3,403,228

Patented Sept. 24, 1968

3,403,228

TELEPHONE PARTY-LINE ISOLATION AND RANGE EXTENSION

Charles W. Zebe, New Shrewsbury, N.J., assignor to Bell Telephone Laboratories, Incorporated, New York, N.Y., a corporation of New York Filed Mar. 9, 1965, Ser. No. 438,318

11 Claims. (Cl. 179—16)

ABSTRACT OF THE DISCLOSURE

I disclose a telephone switching system wherein range extenders are inserted in high impedance customer loops during calls. When a central office provides individual wire pairs to customers who, however, must share a common central office terminal ("dedicated" party-line service), bridge lifters are inserted in conjunction with the range extenders in order to remove the capacitive bridge of the idle wire pair and thus enhance transmission quality on the other pair. The insertions of the range extenders and bridge lifters are made by an auxiliary crossbar switching circuit outside of the conventional telephone office in order to permit shared access to common range extension equipment.

This invention relates to telephone systems and more particularly to telephone systems including outside plant facilities having line loops greater than a predetermined length.

Conventional telephone cables and wire line facilities have in the past been designed in accordance with the distance between substations and a telephone central office. Since the impedance of a telephone loop (the wire pair between the substation and the office) varies in accordance with the length of the loop, it is apparent that the loop impedance of those substations at a relatively greater distance from the office is higher than the corresponding loops of substations which are nearer to the office. As is well known, the distance range of supervisory equipment, including line relays, for example, at the office is predicated on the impedance of the majority of line loops; critical conditions may therefore arise with respect to those substations having loops exceeding a predetermined length (or impedance). A number of corrective efforts have been undertaken with respect to these so-called "long lines." These include the provision of greater diameter or lower gauge wires which exhibit a reduced impedance per unit length for use on the longer lines. Under conditions where it is not practical to use heavier wires for longer lines, specifically designed "long-line" circuits have been employed which are capable of responding to reduced intensity signals from substations on long-line circuits to repeat or amplify such signals.

Although wholly operative and useful the above-described measures exhibit certain disadvantages. Where higher diameter wire is used, it is apparent that cables including such higher diameter wires will of necessity include fewer wire pairs per square inch of cable diameter than conventional pairs. Moreover, the conduits or enclosures in which such cables are placed can contain only a correspondingly reduced number of wire pairs. In high population density urban areas where underground conduit capacity may be fully utilized, capable pair diameters restrict the upper limit of the number of customers that may be served through a particular conduit which number would be increased if smaller or conventional diameter wire pairs were used.

Concerning the installation of supervisory signal repeating equipment or long-line circuits, a disadvantage obtains in the conventional necessity of providing a separate supervisory repeating or long-line circuit for each of the lines to be accorded special service.

It is therefore an object of this invention to provide for the servicing of long lines connected to a telephone central office through the utilization of supervisory equipment common to a relatively large number of long lines.

An aspect of the incorporation of long lines in conjunction with "dedicated" party-line facilities concerns the necessity in the case of such long lines of providing a combined service. Thus supervisory repeating and signal repeating equipment must be incorporated and, in addition, in the case of dedicated party lines, "bridge lifting" equipment is necessary.

This problem derives from the fact that "dedicated" party lines are by physical nature distinct from conventional party lines. The former (dedicated party-line arrangement) encompasses the extension of two individual and independent wire pairs from the central office to the tip and ring party-line subscribers respectively. At the office a common line termination equipment is shared. In consequence, the relatively long wire "runs" to each of the substations give rise to a situation in which a relatively high capacitance due to the wire pair extending to the tip party, for example, will serve as a "bridge" and adversely affect transmission quality when the wire pair of the ring party is being used for conversation. To this end, so-called "bridge lifters" are employed which serve to neutralize or remove the capacitive bridge of the idle wire pair and thus enhance transmission quality on the other pair.

This problem is not as compelling in nondedicated party lines in which conventional practice dictates the use of a single wire pair which extends to the office and to which both customers are connected substantially in parallel.

It is therefore an additional object of this invention to provide for bridge lifting through the shared usage of a group of bridge lifters by a relatively larger number of lines.

These and other objects and features of the invention are achieved in a specific illustrative embodiment in which a "peripheral" switching circuit outside of conventional telephone office equipment is utilized to permit shared access to common range extension equipment. Illustratively, the office may be a step-by-step office or a crossbar office. The link may, for example, be in the form of a crossbar switch on which each long-line customer will have a unique termination in addition to his conventional termination in the central office. Thus the long-line customers may be connected to crossbar switch verticals and range extension equipment to the horizontals. The overall path from the calling substation to the central office includes a "hairpin" route through the crossbar switch. Thus the customer line may be extended to his unique termination on the vertical of a crossbar switch, up through the vertical conductive path, through closed crosspoints, across a horizontal conductive path, through the corresponding range extender coupled to the horizontal path, and returning over a similar horizontal conductive path and a similar vertical path to a wire pair extending to the conventional central office line termination unique to the customer line. The latter termination is the same termination to which the customer would have been connected if directly connected to the office in lieu of through the peripheral link.

In another aspect of the present invention the horizontal conductve paths include bridge lifting equipment as well as range extension equipment in order to serve party lines in dedicated party-line areas. The advantages of "concentration" of bridge lifting as well as other objects and features of the invention may be more readily comprehended from an examination of the following specification, appended claims, and attached drawing in which:

Figures 1, 7, 8:
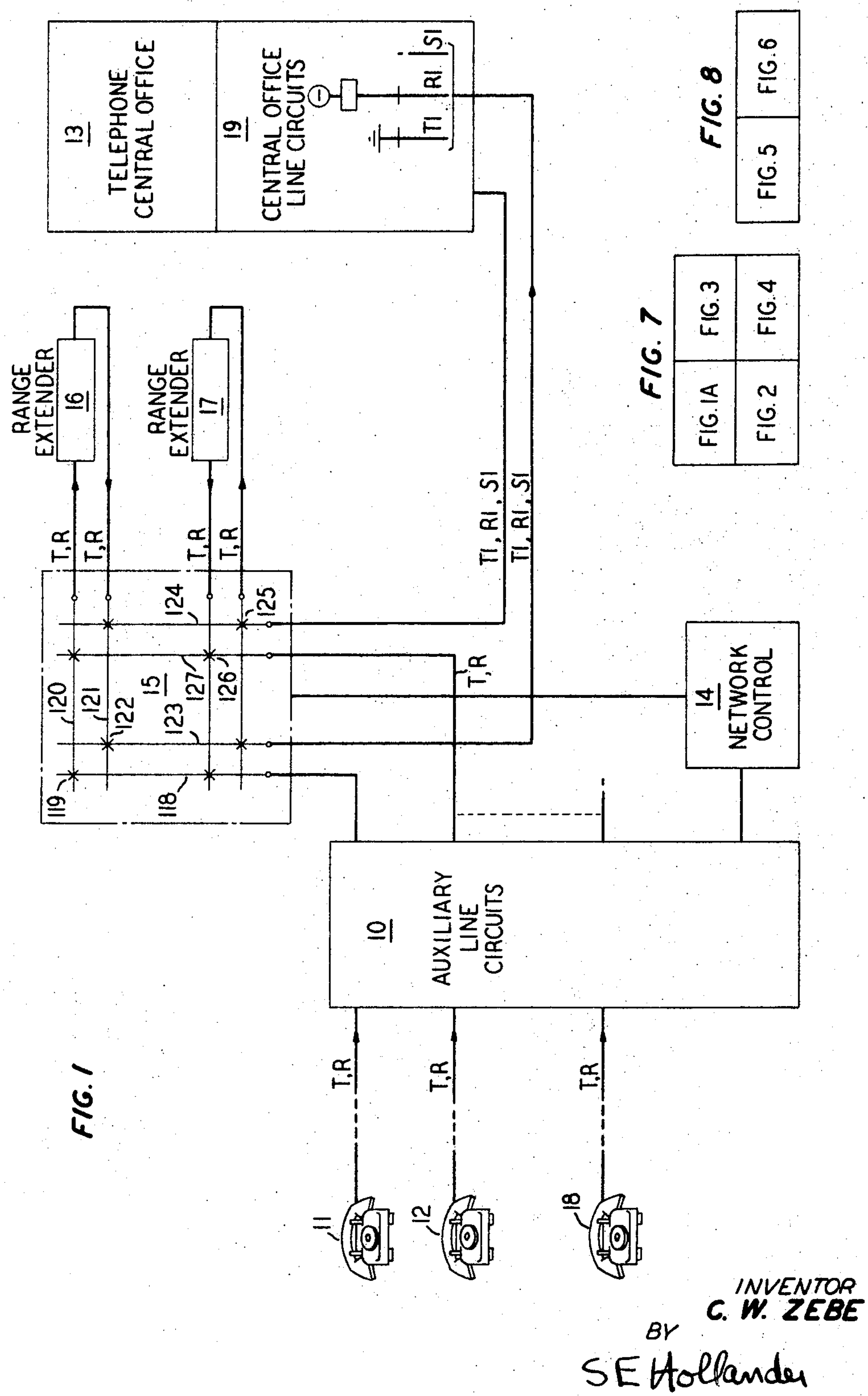
FIG. 1 shows an outline diagram of a peripheral link utilized in conjunction with a conventional switching system.
FIG. 7 shows the appropriate relationship of FIGS. 1A through 4.
FIG. 8 shows the relationship between FIGS. 5 and 6.

As shown in FIG. 1, the arrangement includes a group of auxiliary line circuits 10 having line relays unique to each of the long loop customers 11, 12, etc. Although three are shown it is understood that 80 customers may illustratively be coupled to the crossbar switches. The auxiliary line circuits and sleeve relays are "auxiliary" to or in addition to the conventional line circuits 19 which appear in the switching office 13. Their function is to detect originating and terminating calling conditions from and to the long-line substations 11, 12, etc.

The network control circuitry 14 is responsive to signals from the auxiliary line circuits to govern the operation of the crossbar switching network 15 in extending a connection between a particular long loop customer, an idle gain and range extender circuit 16, etc., and back over a corresponding tip ring and sleeve unique to the line, the latter circuit extending to the conventional line termination in the office. The range extender circuits shown in outline form may be of the type described in an application of A. Feiner, A. Zarouni, and C. W. Zebe, Ser. No. 402,081, filed Oct. 7, 1964, now Patent 3,339,027, issued Aug. 29, 1967.

*General description*

Figure 1A:
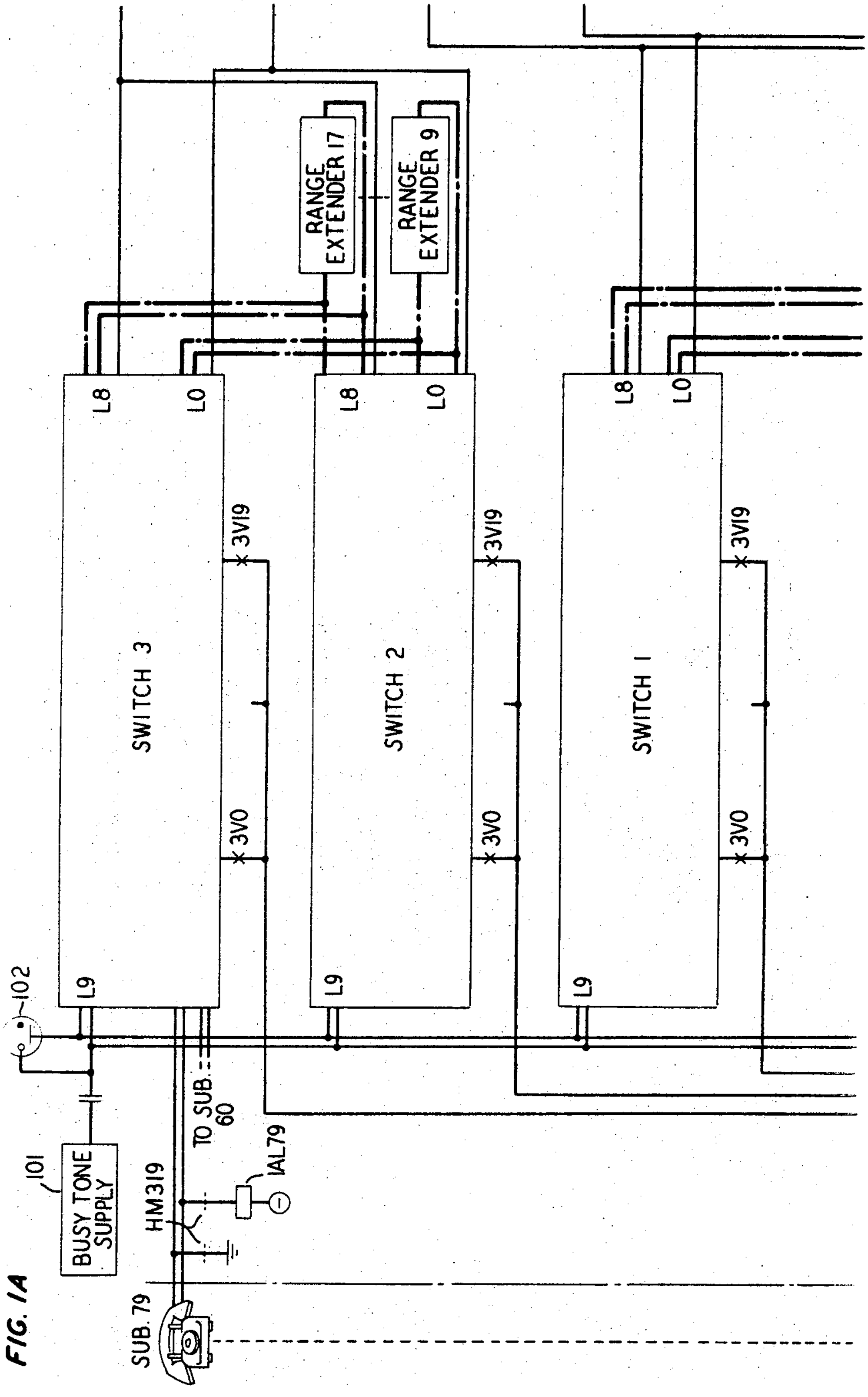
FIGS. 1A and 2 show the peripheral link crossbar switch circuitry and the manner of connection of long lines and range extenders to the crossbar switches.
Figure 2:
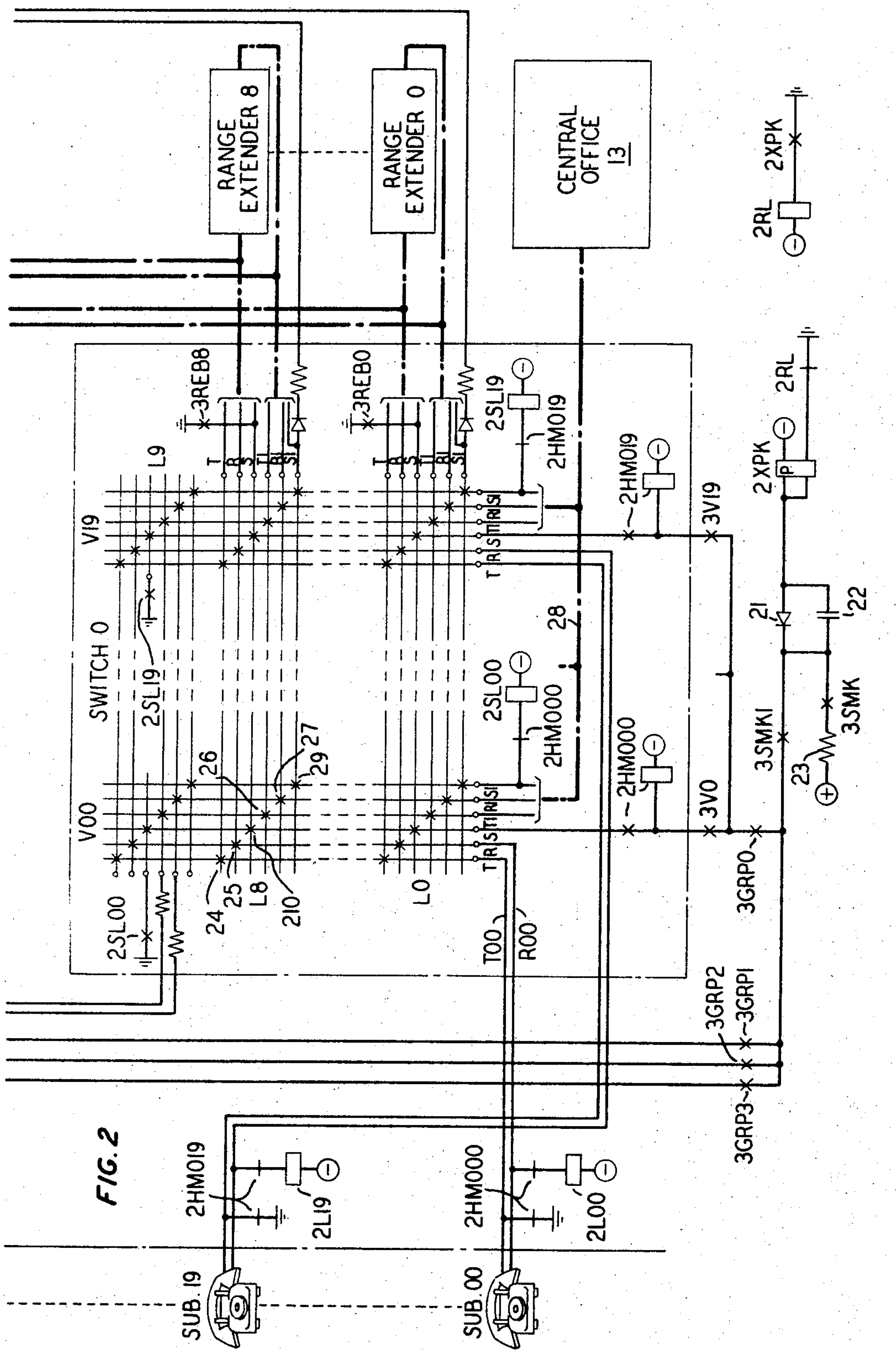

Thus, for example, in response to an off-hook condition at substation 11, a line relay in the auxiliary line circuit 10, not shown therein but shown in detail in FIGS. 1A and 2, is activated. In response to the operation of the auxiliary line relay, the network control 14 proceeds to govern a connection between the tip and ring conductors of the substation 11 and an idle range extender circuit 16, etc. Thus, assuming that range extender 16 is available, the path may be traced from substation 11, tip and ring conductors T and R, auxiliary line circuits 10, vertical conductive path 118, crosspoint 119, horizontal conductive path 120, range extender 16, horizontal conductive path 121, crosspoint 122, vertical conductive path 123, conductors T1, R1 and S1 to the central office line circuits 19. The conductors T1, R1 and S1 are coupled thereat to a conventional telephone line termination which is identical to that to which it would have been connected if connected directly to the office instead of through the peripheral link.

Figure 4:
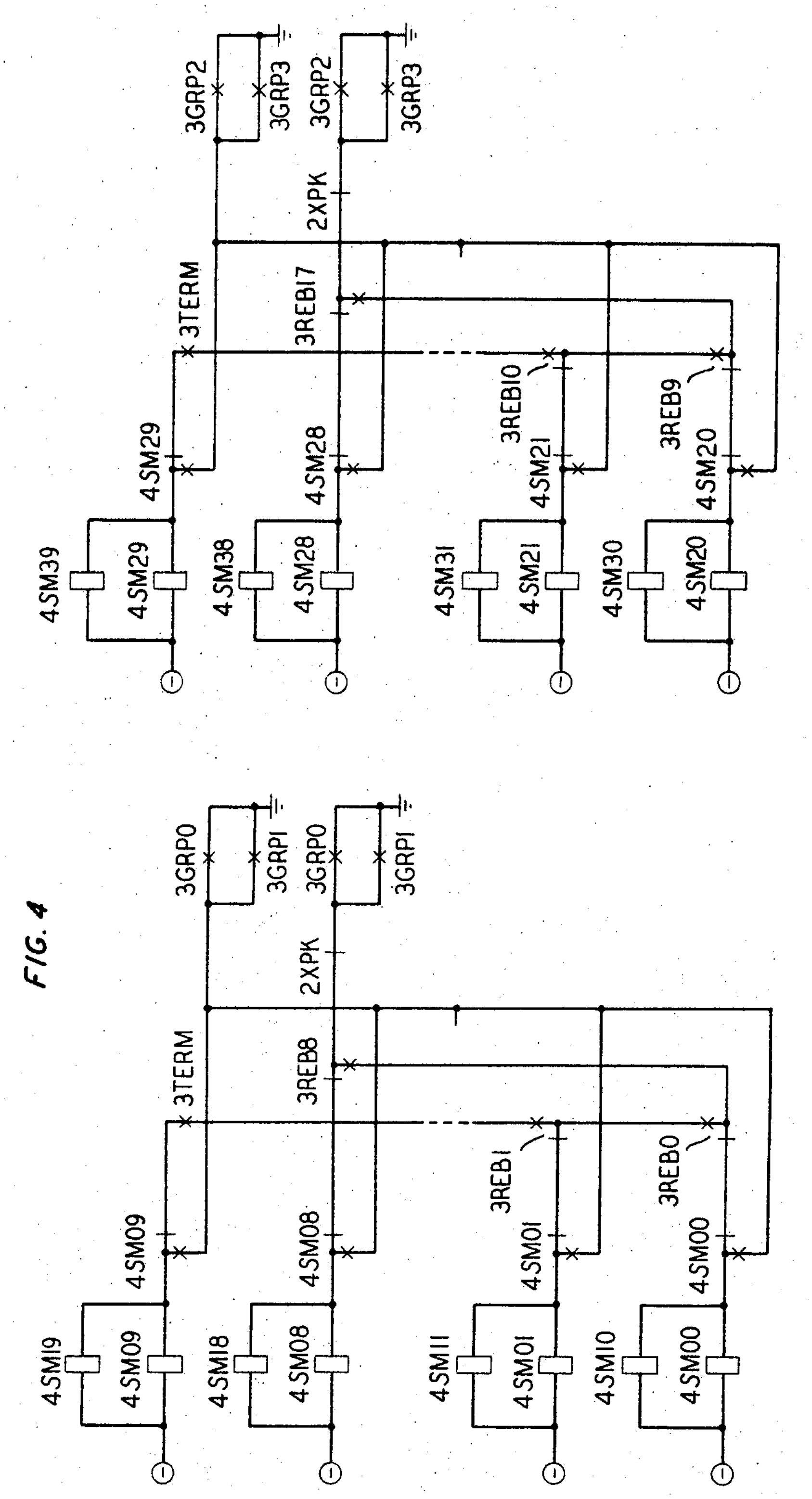
FIG. 4 shows the select magnet operating circuits.

The selected crosspoints 119 and 122 are operated by appropriate select and hold magnets governed by network control 14 as shown in detail in FIGS. 2 and 4.

Assuming now that a terminating call is being extended to substation 18, a conventional reference potential or ground is extended over the sleeve conductor S1 unique to substation 18. Thereupon a sleeve relay, also unique to substation 18, not shown but shown in detail in FIG. 2, is operated and causes the operation of the network control 14 to extend a connection through crossbar switch 15 between an idle range extender circuit 16, 17, etc., and the called line. The response of the network control 14 to the operation of the sleeve relay is similar in nature to its response to the operation of the auxiliary line relay as described above with respect to an originating call by a long-line circuit. Thus, in response to the operation of appropriate select and hold magnets under the direction of network control 14, a path may be traced from the central office line circuits 19 over conductors T1, R1 and S1, vertical conductive path 124, crosspoint 125, range extender circuit 17 (assuming it is idle), crosspoint 126, vertical conductive path 127, conductors T and R, auxiliary line circuits 10 and loops T and R to substation 18. Again a path has been provided for the interposition of an idle range extender circuit between substation 18 and the telephone central office.

*Detailed description of originating call*

It will be assumed for purposes of illustration that the customer at substation 00 in FIG. 2 goes off hook to initiate a service request call. Line relay 2L00 is operated over a path from ground, contacts of relay 2HM000, substation loop, additional contacts of relay 2HM000, winding of relay 2L00 to negative battery. Operation of relay 2L00 causes the operation of relay 3GRP0 over a path which may be traced from ground, contacts of relay 2L00, contacts of relay 3TERM, winding of relay 3GRP0, contacts of relay 3GRP0, contacts of relays 3GRP3, 3GRP2, 3GRP1, additional contacts of relay 3GRP0 to negative battery.

Figure 3:
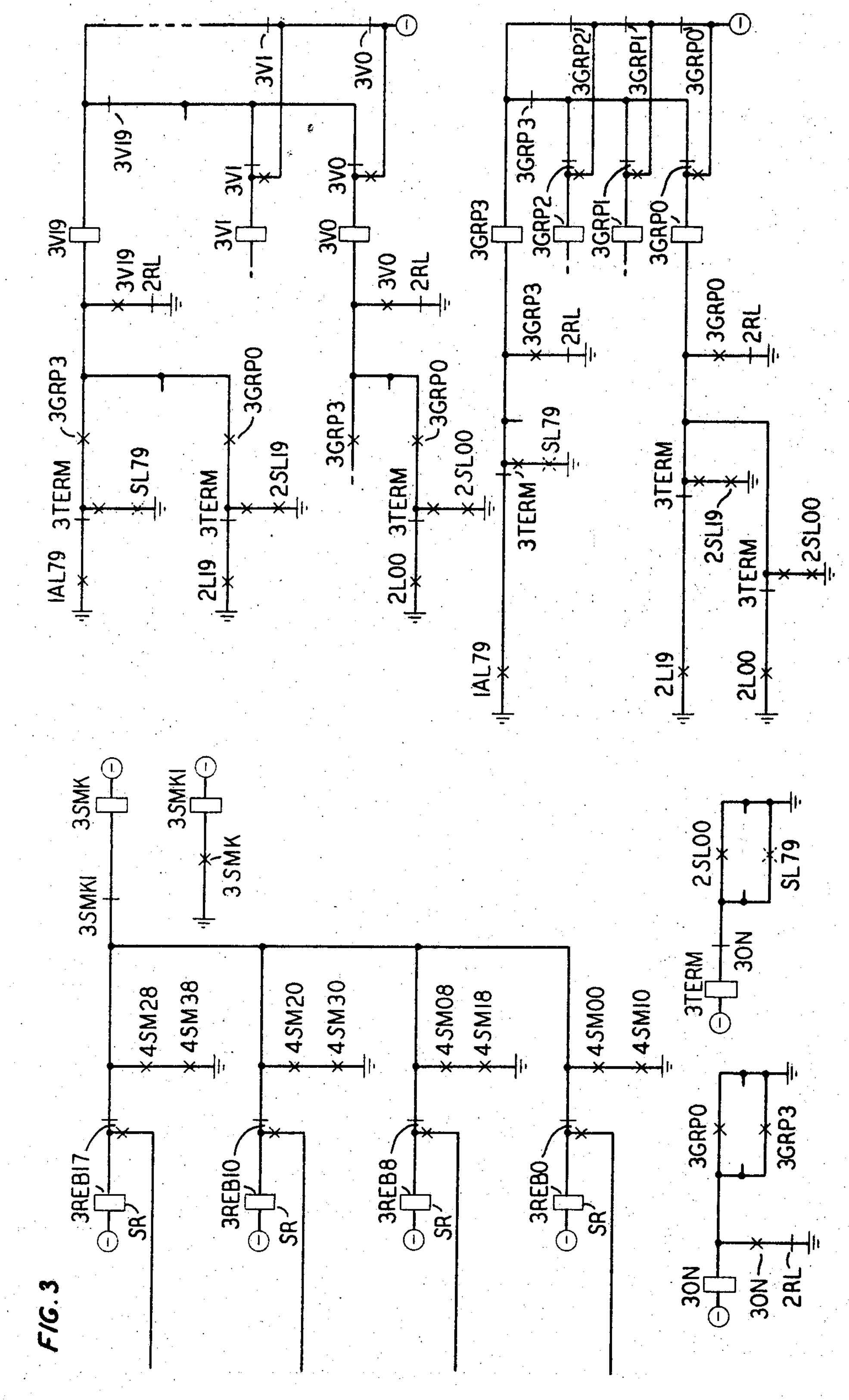
FIG. 3 shows the vertical and group relay circuits and the range extender busy circuits.

Thereafter a path may be traced in FIG. 3 to operate relay 3V0 from ground, contacts of relays 2L00, 3TERM, 3GRP0, winding of relay 3V0, contacts of relays 3V0, 3V19 through 3V1, additional contacts of relay 3V0 to negative battery.

In this manner the group of 20 lines corresponding to a particular crossbar switch and the vertical within the switch uniquely associated with the line are identified. As shown in FIGS. 3 and 4, the line group relays and vertical relays are arranged in preference circuits to permit only one call at a time to be identified.

Subsequent to the operation of relay 3GRP0 a path may be traced in FIG. 4 from ground, contacts of relays 3GRP0, 2XPK, 3REB8 (assuming range extender 8 is idle), contacts of relay (select magnet) 4SM08, winding of relay 4SM08 to negative battery. It will be noted that each of the select magnets 4SM08 and 4SM18 corresponding to the ninth level on the switches 0 and 1 are operated in parallel. Operation of select magnets 4SM08 and 4SM18 in parallel causes the operation of relay 3REB8, the range extender busy relay. This path may be traced in FIG. 3 from ground, contacts of relays 4SM18, 4SM08, 3REB8, winding of relay 3REB8 to negative battery. Relay 3SMK is operated over the contacts of relay 3SMK1.

At this time a path is provided to operate a particular hold magnet. Thus in FIG. 2 a path may be traced from negative battery, winding of hold magnet 2HM000, contacts of relay 3V0, contacts of relay 3GRP0, contacts of relay 3SMK1, capacitor 22, winding of relay 2XPK, contacts of relay 2RL to ground. It will be noted that capacitor 22 was charged when relay 3SMK operated over a path from positive battery, resistance 23, contacts of relay 3SMK, capacitor 22, winding of relay 2XPK to negative battery. Thus, upon the operation of relay 3SMK1, capacitor 22 is discharged over the path described above. Subsequently the hold magnet is held operated over its own contacts and the ground applied to the sleeve conductor at the contacts of relay 3REB8. Moreover, the same ground extends back over the path described above to operate relay 2XPK over the upper winding thereof. When relay 2XPK is operated, relay 2RL is energized to cause the release of relays 3GRP0, 3V0 and 30N at the contacts of relay 2RL, as well as relays 4SM08, 4SM18 and 3REB8.

At this time a path may be traced from substation 00, tip and ring conductors T00 and R00, vertical conductive path V00, crosspoints 24 and 25, horizontal conductive path T, R, range extender 8, horizontal conductive path T1, R1, crosspoints 26 and 27, vertical conductive path V00, conductors T1, R1, cable 28 to the central office line circuit (not shown, see FIG. 1) to which substation 00 would have been connected if directly connected to the office. Under these conditions it is apparent that the range extender 8 has been serially connected in series between the calling customer and his conventional line termination in the central office. Since hold magnet 2HM000 is held operated over the sleeve ground in the central office over conductor S1, the path will be released when the calling customer disconnects.

Moreover, although a call from substation 00 was shown as exemplary, it is understood that switches 0, 1 and 2 and 3 are respectively equipped to couple 40 lines to nine range extenders respectively on a shared basis.

*Detailed description—Terminating call*

When a terminating call is initiated to a long-line customer, the central office in a conventional manner extends a ground condition on sleeve conductor S1. Assuming that the call is directed to substration 00, a path may be traced from the central office line circuits shown in FIG. 1 over sleeve conductor S1 (FIG. 2), contacts of relay 2HM000, winding of relay 2SL00 to negative battery. The operation of relay 2SL00 causes the operation of relay 3TERM over the contacts of relays 2SL00 and 30N. Thereupon, relay 3GRP0 is operated over a path from ground, contacts of relays 2SL00, 3TERM, winding of relay 3GRP0, contacts of relays 3GRP0, 3GRP3, 3GRP2, 3GRP1, additional contacts of relay 3GRP0 to negative battery. Subsequently relay 3V0 operates from ground, contacts of relays 2SL00, 3TERM, 3GRP0, winding of relay 3V0, contacts of relays 3V0, 3V19 through 3V1, additional contacts of relay 3V0 to negative battery. Subsequent to the operation of relay 3GRP0 a path may be traced for the operation of relay 4SM08 (again assuming that range extender 8 is available) which is similar to the path described above on an originating call. Moreover, the vertical magnet 2HM000 and range extender busy relay 3REB8 are operated in the manner described above.

In each instance, if all range extenders are busy, the select magnet on level 9 is operated to connect busy tone supply 101 to the calling line after gas tube 102 operates to trip ringing. Thus if all range extenders are busy a path may be traced in FIG. 4 from ground, contacts of relays 3GRP0, 2XPK, 3REB8, 3REB0, 3REB1–3REB7, contacts of relays 3TERM, 4SM09, windings of select magnets 4SM09 and 4SM19 in parallel to negative battery.

Assuming, however, that a path was available through range extender 8, the circuit now extends from the conventional central office line termination (not shown but see FIG. 1), conductors T1, R1 and S1, crosspoints 26, 27, 29, horizontal conductive path T1, R1, S1, range extender 8, horizontal conductive path T, R, S, crosspoints 24, 25 and 210, vertical conductive path T, R, S, conductors T00 and R00 to substation 00.

Thus, again, the range extender circuit is included in series in the path to the called customer via the peripheral link.

*Dedicated two-party operation*

Figure 5:
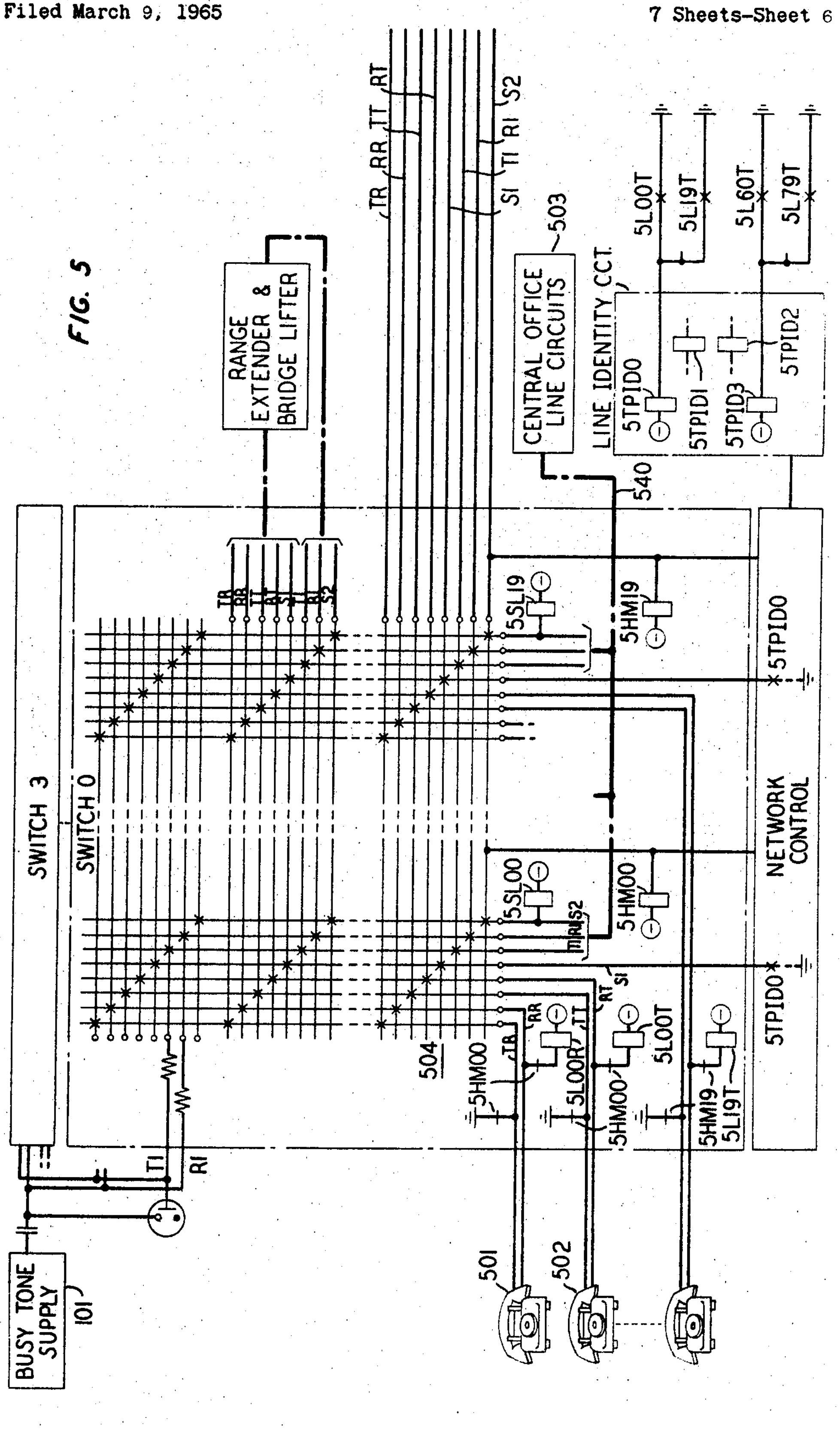
FIGS. 5 and 6 show the manner of connection of the bridge lifting equipment and the range extension equipment to the crossbar circuitry for use in dedicated two-party plant.
Figure 6:
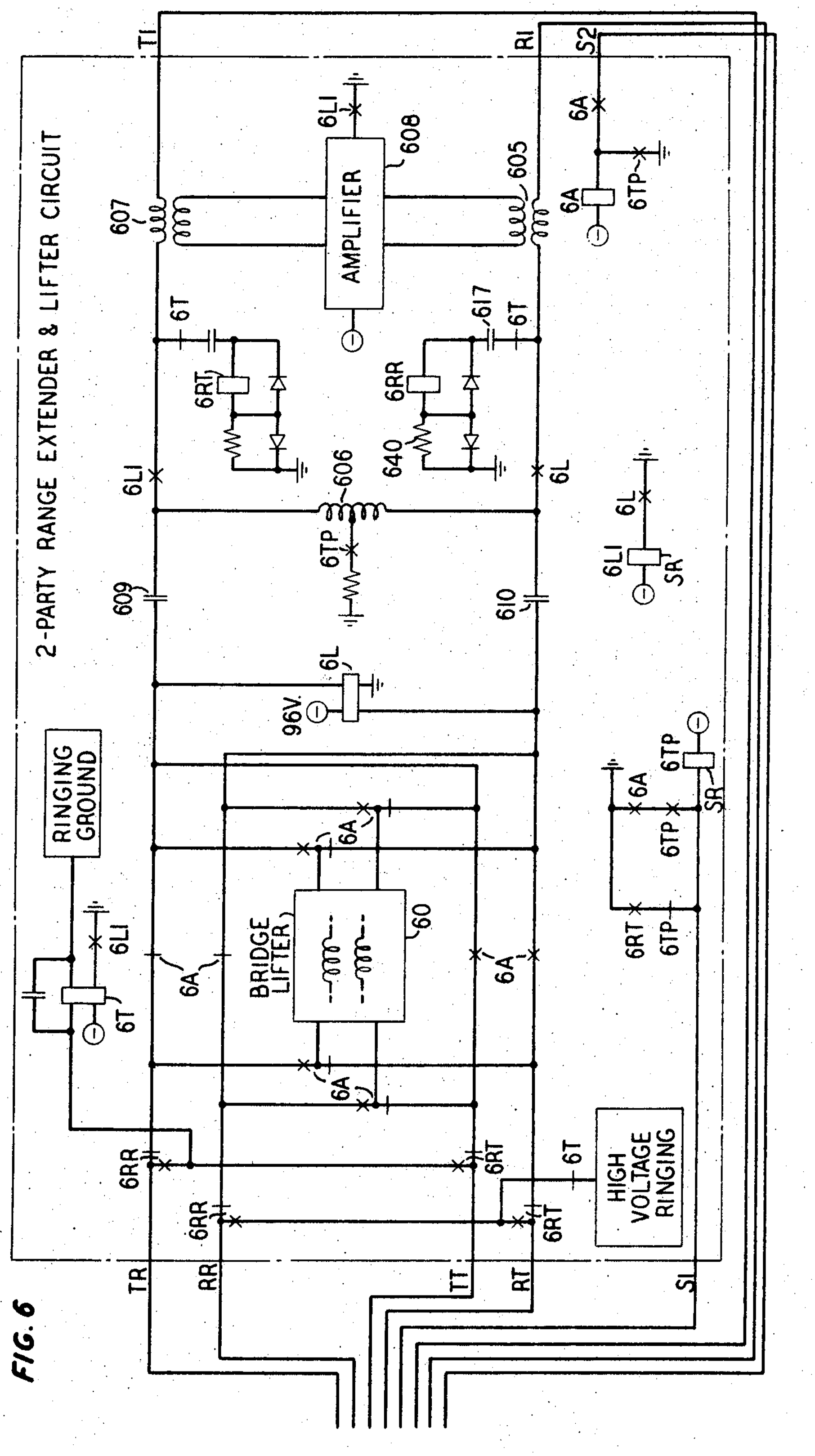

Referring now to FIGS. 5 and 6, range extension facilities in conjunction with bridge lifting facilities are shown. So-called "bridge lifters" are useful when multi-party dedicated outside plant is employed. The term "dedicated" refers to the concept of supplying separate loop extension (tip and ring conductors) to each party of a two-party line for example. Thus, each of the party-line customers has an individual physical loop. The two loops are coupled at the office to a common termination. This procedure differs from conventional party line outside plant facilities which latter provide for the paralleling of the party-line customers in the field and providing a common loop to the office.

It is apparent from the physical disposition of dedicated outside plant facilities that a tip party caller on a two-party line will have the entire loop run of the ring party and the attendant distributed capacitance thereof in parallel with or in "bridge" with his line. The effect of such a bridging capacitance is to cause a deterioration or attenuation of transmission. In consequence, so-called "bridge lifters" are used to literally lift the bridging effect of the idle party line. Typical bridge lifters of this type are shown in Patents 2,924,667 of Feb. 9, 1960, of L. Hochgraf, and 3,073,908 of Jan. 15, 1963, of L. Hochgraf et al.

In the circuitry shown in FIGS. 5 and 6, arrangements have been made to cope with the unique problems presented by dedicated two-party outside plant facilities which are also "long lines." The crossbar switching facilities shown in FIG. 5 are similar to those described for FIG. 2 with the exception that each crosspoint includes a vertical for each of the lines on a two-party line and, in consequence, eight-wire crosspoints are utilized. Moreover, the range extension facilities shown in detail in FIG. 6 include equipment necessary for partly-line operation. The bridge lifter 60 shown in outline form in FIG. 6 may be of any suitable type including that described in the above-referred-to patents of L. Hochgraf and L. Hochgraf et al.

Only that portion of the circuitry necessary for a complete understanding of the invention is shown in detail. The remainder of the material shown in outline form in FIGS. 5 and 6 is well known or shown in detail in FIGS. 1A–4. The tip party line 502 and the ring party line 501 are connected to individual vertical conductive paths in the crossbar switch 0. Although only two verticals are shown it is understood that, illustratively, 20 verticals may be utilized, each of which has a pair of party lines terminated thereon. Moreover, only two range extender circuits and bridge lifter circuits are shown coupled to the horizontals. It is understood that, illustratively, nine range extender circuits and bridge lifter circuits may be coupled to the switch horizontals of each switch. As shown for FIG. 1A, a horizontal level on each switch is reserved for overflow or busy tone supply 101. A call from or to the ring party station 501 is completed by operating a separate path through the crossbar network to the selected extender and lifter circuit and thereafter over a common path from the range extender circuit to the conventional termination in the central office over cable 540. The latter cable which includes a tip, ring and sleeve conductor extends to the conventional central office line circuits shown in part in FIG. 1. The central office circuits 503 represent the line terminations to which the calling substations would have been connected if directly connected to the office in lieu of being coupled through range extension and bridge lifting equipment.

*Originating call—Ring party*

If it is assumed for purposes of illustration that the ring party 501 is initiating a call, an off-hook condition at substation 501 completes a path for the operation of relay 5L00R. This path may be traced from ground, contacts of relay 5HM00, loop to substation 501 and return, additional contacts of relay 5HM00, winding of relay 5L00R to negative battery. In this case relay 5HM00 is actually the hold magnet for the vertical path uniquely associated with substations 501 and 502. As described above for the operation of individual (nonparty) lines, the operation of line relay 5L00R initiates the operation of the line identity circuit shown in outline form in FIG. 5 and in detail in FIG. 3. In essence, the closure of the contacts of relay 5L00R results in the actuation of unique vertical relays and unique group relays in the manner shown in FIG. 3 to identify the line. Thereafter, a select magnet is operated in conjunction with the availability of a range extension and bridge lifting circuit associated with the select magnet level. This procedure is shown in detail in FIG. 4 and includes relay chains of the range extender busy relays 3REB– and the select magnets themselves.

An appropriate hold magnet, in the assumed example, hold magnet 5HM00, is operated in accordance with the vertical selection made in the line identity circuit in the manner disclosed in FIG. 3. Thereupon the crosspoints 504 are closed and the tip and ring conductors of the ring party line are coupled over vertical conductors TR and RR and horizontal conductors TR and RR to the range extender and bridge lifter circuit. Thereupon relay 6L is operated over a path from ground, winding of relay 6L, contacts of relays 6A, 6RR, conductor TR through the path extending to substation 501 described above, conductor RR, additional contacts of relay 6RR, additional contacts of relay 6A, other winding of relay 6L to negative battery. The operation of relay 6L causes the operation of relay 6L1 over an obvious path. Moreover, the operation of both relays 6L and 6L1 completes a shunt path to the central office over conductors T1 and R1, coils 605, 606 and 607 as well as the contacts of relays 6L and 6L1. In addition, the amplifier 608 is energized at the contacts of relay 6L1, and relay 6T is operated over the lower winding and the contacts of relay 6L1. Operation of the latter relay removes the ringing detection bridge (relays 6RT, 6RR) from the line. Thus a path extends from substation 501 over conductors TR and RR in the vertical conductive path, crosspoint 504, conductors TR and RR in the horizontal conductive path, contacts of relay 6RR in parallel, contacts of relay 6A in parallel, condensers 609 and 610 in parallel, contacts of relays 6L and 6L1 in parallel, coils 605 and 607 in parallel, conductors T1 and R1 in the horizontal conductive path, crosspoint 504, conductors T1 and R1 in the vertical conductive path to the telephone central office.

Subsequently, when dial tone is received and the ring party at substation 501 begins dialing, relay 6L in the range extender repeats the pulses toward the central office. Thereafter, relay 6L provides a higher than normal (96 volt) talking battery potential to the substation 501. Bridge lifter 60 is coupled in series with the idle tip party line TT over the contacts of relay 6A, over a path which may be traced from conductor TT of the tip party line, contacts of relays 6RT, 6A, bridge lifter 60, additional contacts of relay 6A to conductor TR. A similar path may be traced between conductors RT and RR. The tip party loop is coupled to conductors TT and RT upon the closure of crosspoint 504 in the same manner described above for the connection of the ring party loop to the conductors TR and RR. The connecting of the bridge lifter 60 in series with each leg of the tip party line is operative to remove the effect of the tip party bridging connection during conversation.

*Terminating call to ring party*

In response to the conventional ground potential applied to the sleeve conductor in the central office line circuit and assuming that the call is directed to ring party substation 501, a path is available for the operation of relay 5SL00 over cable 540 from the central office line circuits 503. Operation of the latter relay extends a ground to the line identity scanner in the manner described above and shown in detail in FIG. 3. Thus a particular vertical relay and group relay are energized to condition the selection of a hold magnet associated with the called line, and a range extender and lifter are selected by a range extension busy chain and select magnet chain as shown in FIGS. 3 and 4. When the called line is identified and the crosspoints are closed, the selected idle range extender is coupled to a called line. Thereupon conventional ringing signals are delivered to the ringing detection bridge in the range extender circuit. Since a ring party is being called, the ringing potential is applied over conductor R1, coil 605, contacts of relay 6T, condenser 617, winding of relay 6RR, resistance 640 to ground. Operation of relay 6RR places high voltage ringing on conductors TR and RR extending to the called station. Bridge lifter 60 remains connected as described above.

*Originating call by tip party*

If it is assumed that the tip party at substation 502 is initiating a call, relay 5L00T will be energized over a path from negative battery, winding of relay 5L00T, contacts of relay 5HM00, substation loop to substation 502, additional contacts of relay 5HM00 to ground. Thereupon a path is energized in the line identity circuit over the contacts of relay 5L00T to operate a particular tip party identifying group relay, in this case relay 5TPID0, indicating a tip party call in switch 0. An idle range extender circuit, select magnet and hold magnet are selected in the manner described above for a ring party originating call. The operation of relay 5TPID0 applies a ground potential to the sleeve conductors in switch 0 and upon the operation of crosspoint 504 results in the operation of relay 6TP.

Operation of relay 6TP in turn causes the operation of relay 6A over an obvious path. The latter transfers bridge lifter 60 from the tip party loop to the ring party conductors TR and RR extending to the ring party loop. After crosspoint 504 was closed as described above, relays 6L and 6L1 were operated. In this case relay 6L is operated over the tip party loop. When relay 6L1 is operated, amplifier 608 is energized and the path to the central office is completed over the contacts of relays 6L and 6L1 to initiate a dial tone request. Operation of relay 6TP causes a tip party ground to be placed on the tip and ring conductors over the contacts of relay 6TP and coil 606 for detection at the central office.

*Terminating call to tip party*

When a terminating call is initiated to a tip party, for example to substation 502, a sleeve ground condition from the central office line circuits 503 operates the associated sleeve relay 5SL00. The latter relay extends a ground condition to the line identity scanner in a manner similar to that shown for the sleeve relay contacts in FIG. 3. A particular group relay is also operated in a manner similar to that described above. Subsequently the called line is identified and appropriate crosspoints are closed to couple the called line to an idle range extender and bridge lifter in the manner described above for an originating call.

Thereafter, conventional ringing current is delivered from the central office on the tip side of the line. In consequence, relay 6RT is operated which in turn extends high voltage ringing and ringing ground circuits through the trip relay 6T to the tip party line over conductors TT and RT. Operation of relay 6RT causes the operation of relay 6TP over the contacts of relays 6RT and 6TP. Relay 6A is operated over the contacts of relay 6TP and transfers the bridge lifter 60 to the ring party loop over the conductors TR and RR. If substation 502 is answered during a ringing interval, relay 6T will operate to trip ringing. If substation 502 is answered during the silent interval, relay 6L operates and in turn causes the operation of relay 6L1. The contacts of the latter operates relay 6T over the lower winding to remove ringing current from the line. As before, the operation of relays 6L and 6L1 provides a shunt condition toward the central office to trip ringing thereat and to energize amplifier 608 to provide gain in the talking connection. At this time the calling and called customers are interconnected through crosspoint 504 and the range extender and lifter circuit 640 which is connected to the conventional line termination and the auxiliary line termination of the called customer.

It is to be understood that the above described arrangements are illustrative of the application of the principles of the invention. Numerous other arrangements may be devised by those skilled in the art without departing from the spirit and scope of the invention.

What is claimed is:

1. A telephone switching system including a telephone office, a plurality of substation lines, a plurality of terminations in said office individual to said lines, auxiliary switching means connected to said substations and said line terminations, range extender means and bridge lifter means less in number than said lines, and control means effective in response to a supervisory condition on one of said lines for controlling said auxiliary switching means to couple said range extender means and bridge lifter means to said one line and said corresponding individual termination in said office.

2. A telephone switching system including a telephone office, a plurality of substation lines, auxiliary switching means including crossbar means having horizontal and vertical conductive paths and crosspoints at the intersections of said paths, a plurality of line terminations in said office individual to said substation lines, means for coupling said substation lines and line terminations to said vertical conductive paths, range extender means less in number than said lines, means for coupling said range extender means to said horizontal conductive paths, and control means effective in response to a service request condition on one of said lines for controlling said crossbar means to couple a selected range extender means in series with said one line and said corresponding termination in said office.

3. A telephone switching system including a telephone central office, a plurality of two-party lines including tip party lines and ring party lines, auxiliary switching means comprising crossbar means having horizontal and vertical conductive paths and crosspoints at the intersections of said paths, a plurality of line terminations in said office individual to each pair of tip party and ring party lines, means for coupling said tip party substation lines and ring party substation lines to said vertical conductive paths, range extender means and bridge lifter means less in number than said lines, means for coupling said range extender and bridge lifter means to said horizontal conductive paths, means for coupling said line terminations to additional vertical conductive paths, and control means effective in response to a service request condition on one of said party lines of said pairs of lines for controlling said crossbar means to couple an idle range extender means and bridge lifter means to said one line and said corresponding line termination including means for lifting the capacitance bridge of the other party line of said pair.

4. A telephone switching system in accordance with claim 3 wherein said control means includes line relay means individual to said tip party lines and line relay means individual to said ring party lines.

5. A telephone switching system in accordance with claim 3 including in addition a busy tone source coupled to one of said horizontal conductive paths for supplying busy tone to a calling one of said substations when all of said range extender and bridge lifter means are occupied.

6. A telephone switching system including a telephone office, a plurality of substation lines, crossbar switching means having horizontal and vertical conductive paths and crosspoints at the intersections of said paths, a plurality of select magnets individual to said horizontal conductive paths, a plurality of vertical magnets individual to said vertical conductive paths, a plurality of line terminations in said office individual to said substation lines, range extender means less in number than said lines and coupled to said horizontal conductive paths, means for coupling said lines and line terminations to said vertical conductive paths, and control means effective in response to a calling condition on one of said lines for energizing appropriate select and hold magnets to couple a selected range extender means in series with said line and said corresponding line termination in said office.

7. A telephone switching system including a telephone office, a plurality of substation lines including pairs of tip party lines and ring party lines, crossbar switching means having horizontal and vertical conductive paths and crosspoints at the intersections of said paths, a plurality of line terminations in said office individual to said lines, range extender means and bridge lifter means less in number than said lines and coupled to said horizontal conductive paths, means for coupling said pairs of tip party lines and ring party lines to said vertical conductive paths, means for coupling said line terminations to additional vertical conductive paths, a plurality of select magnets and hold magnets individual respectively to said horizontal and vertical conductive paths, and control means effective in response to a service request condition on one of said lines of a pair for controlling said select and hold magnets to couple an idle range extender and bridge lifter means in series between said one line and said corresponding office line termination including means for lifting the capacitance bridge effected by the other line of said pair.

8. A telephone switching system including a telephone office, a plurality of pairs of substation party lines, auxiliary switching means including crossbar means having horizontal and vertical conductive paths and crosspoints at the intersections of said paths, a plurality of line terminations in said office individual to said substation line pairs, means for coupling said substation lines and line terminations to said vertical conductive paths, range extender means and bridge lifter means less in number than said lines, means for coupling said range extender and bridge lifter means to said horizontal conductive paths, sleeve relay means individual to pairs of said lines, and control means effective in response to a terminating call to one of said lines of pairs for controlling said crossbar means to couple a selected range extender means in series with said one line and said corresponding termination in said office and to couple a selected bridge lifter means to the other line of said pair.

9. A telephone switching system including a telephone office, a plurality of substation lines, crossbar switching means having horizontal and vertical conductive paths and crosspoints at the intersections of said paths, a plurality of select magnets individual to said horizontal conductive paths, a plurality of vertical magnets individual to said vertical conductive paths, a plurality of line terminations in said office individual to said substation lines, range extender means less in number than said lines and coupled to said horizontal conductive paths, means for coupling said lines and line terminations to said vertical conductive path, and control means including a plurality of group relays and vertical relays operative in accordance with a code to represent the identity of a calling line for energizing appropriate select and hold magnets to couple a selected range extender means in series with said one line and said corresponding line termination in said office.

10. A telephone switching system in accordance with claim 9 wherein said control means includes in addition a plurality of range extender busy relays arranged in a chain circuit for governing the selection of an idle range extender means in acocrdance with a predetermined preference order.

11. A telephone switching system including a telephone office, a plurality of substation lines, a plurality of terminations in said office individual to said lines, auxiliary switching means connected to said lines and line terminations, range extender means less in number than said lines, control means effective in response to a terminating calling condition to one of said lines for controlling said auxiliary switching means to couple said range extender means in series with said one line and said corresponding individual termination in said office, and means effective in response to a busy condition of each of said range extender means for supplying overflow tone to said termination individual to said called line.

References Cited

UNITED STATES PATENTS 1,763,893 6/1930 Krecek -------------- 179—16

KATHLEEN H. CLAFFY, *Primary Examiner.*

A. H. GESS, *Assistant Examiner.*